United States Patent
Speidel et al.

(10) Patent No.: US 10,090,534 B2
(45) Date of Patent: Oct. 2, 2018

(54) ELECTROCHEMICAL SYSTEM FOR A FUEL CELL SYSTEM WITH AN EMBOSSED CONTACTING PLATE

(71) Applicant: REINZ-Dichtungs-GmbH, Neu-Ulm (DE)

(72) Inventors: Andre Speidel, Orsenhausen (DE); Joachim Scherer, Ulm (DE); Thomas Stoehr, Laupheim (DE)

(73) Assignee: Reinz-Dichtungs-GmbH, Neu-Ulm (DE)

( * ) Notice: Subject to any disclaimer, the term of this patent is extended or adjusted under 35 U.S.C. 154(b) by 270 days.

(21) Appl. No.: 14/868,888

(22) Filed: Sep. 29, 2015

(65) Prior Publication Data
US 2016/0102410 A1    Apr. 14, 2016

(30) Foreign Application Priority Data
Sep. 30, 2014   (DE) .................. 20 2014 007 977 U

(51) Int. Cl.
*H01M 8/02* (2016.01)
*H01M 8/0254* (2016.01)
(Continued)

(52) U.S. Cl.
CPC ............ *H01M 8/0254* (2013.01); *C25B 1/04* (2013.01); *C25B 9/18* (2013.01); *C25B 13/02* (2013.01); *H01M 8/0228* (2013.01); *H01M 8/0247* (2013.01); *H01M 8/0267* (2013.01); *H01M 8/0278* (2013.01); *H01M 8/04007* (2013.01);
(Continued)

(58) Field of Classification Search
None
See application file for complete search history.

(56) References Cited

U.S. PATENT DOCUMENTS 5,858,569 A * 1/1999 Meacher ............... H01M 8/021
429/413
6,080,503 A * 6/2000 Schmid ..................... C25B 9/10
429/483

(Continued)

FOREIGN PATENT DOCUMENTS

DE     102011056756 A1 * 6/2013 .......... H01M 8/0204
KR     1020050109851 A      11/2005

OTHER PUBLICATIONS

Search Report from Priority German Application DE 20 2014 007 977.

*Primary Examiner* — Ula C Ruddock
*Assistant Examiner* — Tony S Chuo
(74) *Attorney, Agent, or Firm* — Marshall & Melhorn, LLC

(57) ABSTRACT

An electrochemical system is described having an end plate, a stack cover plate adjacent to the end plate and at least one metallic electrical conductor. The stack cover plate has an electrically conductive contacting plate adjacent to the end plate and an electrically conductive separator plate half facing away from the end plate. The contacting plate and the separator plate half are connected to each other electrically and media-tight. The metallic electrical conductor extends to an outside of the electrochemical system. The metallic electrical conductor and the contacting plate are in one piece or the metallic electrical conductor contacts the contacting plate directly. The contacting plate and the separator plate half are bonded to each other.

23 Claims, 9 Drawing Sheets

(51) Int. Cl.
  *C25B 9/18*      (2006.01)
  *H01M 8/0228*    (2016.01)
  *H01M 8/0247*    (2016.01)
  *H01M 8/0267*    (2016.01)
  *H01M 8/0276*    (2016.01)
  *C25B 1/04*      (2006.01)
  *C25B 13/02*     (2006.01)
  *H01M 8/04007*   (2016.01)
  *H01M 8/04082*   (2016.01)
  *H01M 8/1004*    (2016.01)
  *H01M 8/24*      (2016.01)
  *H01M 8/1018*    (2016.01)

(52) U.S. Cl.
  CPC ..... *H01M 8/04201* (2013.01); *H01M 8/1004* (2013.01); *H01M 8/24* (2013.01); *H01M 2008/1095* (2013.01); *Y02E 60/366* (2013.01)

(56) References Cited

U.S. PATENT DOCUMENTS

| | | | |
|---|---|---|---|
| 2001/0021470 A1* | 9/2001 | May | H01M 4/8652 429/414 |
| 2002/0172852 A1* | 11/2002 | Frank | H01M 8/0258 429/434 |
| 2003/0152819 A1* | 8/2003 | Hatoh | H01M 8/0221 429/437 |
| 2005/0244703 A1 | 11/2005 | Osenar et al. | |
| 2006/0068263 A1* | 3/2006 | Kim | H01M 8/0221 429/483 |

* cited by examiner

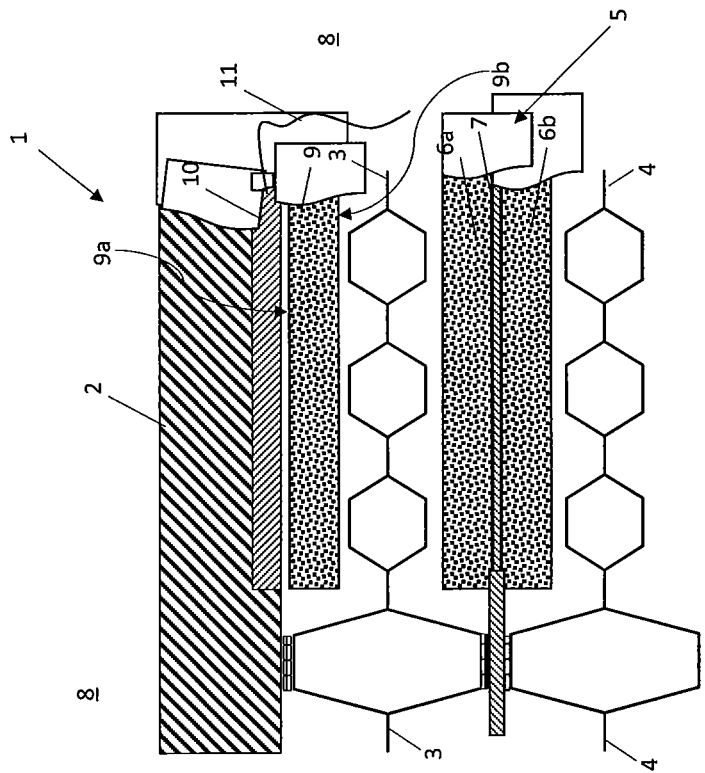
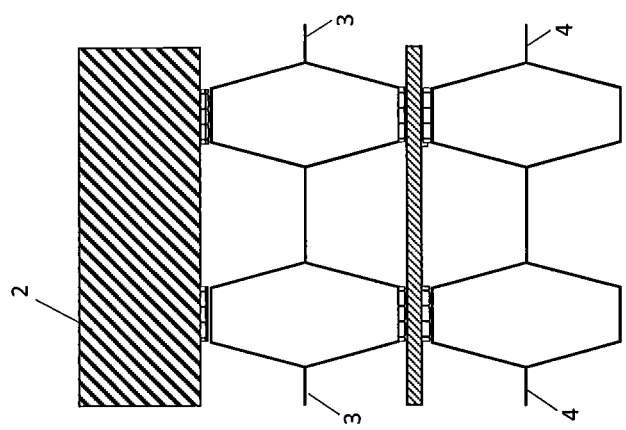
Fig. 1
PRIOR ART

ELECTROCHEMICAL SYSTEM FOR A FUEL CELL SYSTEM WITH AN EMBOSSED CONTACTING PLATE

BACKGROUND OF THE INVENTION

This invention relates to an electrochemical system, e.g. a fuel cell system, an electrochemical compressor or an electrolyzer, with an end plate and a stack cover plate as described in the introductory portions of the independent claims.

Electrochemical systems of the prior art conventionally have two end plates, between which a plurality of metal separator plates or bipolar plates are located in a stack. Neighboring separator plates thereby normally enclose electrochemical cells in which chemical energy is converted into electrical energy or vice-versa. Likewise, the electrochemical cells can be used to electrochemically increase the pressure in a hydrogen system. For this purpose it is necessary for the system to have electrical conductors that connect to the electrodes of the electrochemical cells with an outside of the system, and by means of which an electrical voltage can be applied to the electrodes or can be picked up. These conductors are then typically connected or can be connected with an electrical consumer or with an electrical voltage source.

Conventionally the supply or discharge of electrical energy or the application or pickup of the electrical voltage to or from the electrochemical system takes place via at least one of the end plates and via the separator plate adjacent to this end plate. The latter is also called the cover plate, cover separator plate or optionally the cover bipolar plate because it covers the plate stack toward the respective end plate. The electrical connection between the cover plate and the outside of the electrochemical system is conventionally established by means of a metallic current lead on a side of the end plate facing the cover plate and via an electrically conductive gas diffusion layer or GDL that is located between the current lead and the cover plate and is in electrical contact with the latter. The current lead is connected with the outside of the system, e.g. by means of an electrical cable. The gas diffusion layer is conventionally in the form of a fabric or similar structure containing graphite.

However, it has been repeatedly shown that high ohmic losses occur with this type of electrical contact with electrodes of the electrochemical cells of the plate stack.

Conventionally, both the end plate as well as the cover plate have openings for reaction media and coolant, each of which openings is sealed. If, as is conventional, the end plate is manufactured from a polymer material and the cover plate is metal, significantly different expansions and contractions occur during the heating and cooling of the electrochemical system which destroy the sealing devices of the prior art, so that the seal of the electrochemical system is not guaranteed in the long term.

BRIEF SUMMARY OF THE INVENTION

The object of this invention is therefore to create an electrochemical system with an improved electrical connection between the cell stack and the outside of the system.

Alternatively, the object of this invention is to create an electrochemical system with a sealing device located between a cover plate and an end plate, wherein the sealing device is designed to have the longest possible life even when exposed to severe temperature variations. Preferably, it should also be possible to manufacture the system as easily and economically as possible.

The invention therefore relates to an electrochemical system with an end plate, a stack cover plate adjacent to the end plate and at least one metallic electrical conductor. The stack cover plate has an electrically conducting contacting plate adjacent to the end plate and an electrically conducting separator plate half facing away from the end plate. The contacting plate and the separator plate half can be connected with each other electrically and media-tight. The metallic electrical conductor extends to an outside of the electrochemical system.

The electrochemical system according to the invention is distinguished from systems of the prior art in that the metallic electrical conductor and the contacting plate are in one piece or that the metallic electrical conductor is directly in contact with the contacting plate.

Because the metallic electrical conductor that extends to the outside of the system and the contacting plate are in one piece or because the metallic electrical conductor is directly in contact with the contacting plate, ohmic losses that occur along the electrical connection between the contacting plate and the outside of the system and are caused, for example, by contact voltages and/or fritting voltages, are significantly reduced in comparison to systems of the prior art.

The metallic electrical conductor can be in the form of an electrical cable, e.g. a copper cable. Basically, however, any appropriate metal can be used. Preferably, the metallic electrical conductor is one piece. The metallic electrical conductor should also preferably be understood as being in one piece if it has a cable shoe or a plug on its end contacting the contacting plate.

The electrochemical system can be a fuel cell system, electrochemical compressor or an electrolyzer, for example. Conventionally, electrochemical systems of this type have two end plates, between which are located a plurality of separator plates. An electrochemical cell is typically located between neighboring separator plates or bipolar plates. The electrochemical system therefore normally has a plurality of electrochemical cells. The purpose of these electrochemical cells can be to convert chemical energy into electrical energy or vice versa, or to electrochemically increase the pressure in a hydrogen system.

In one embodiment of the electrochemical system, the contacting plate and the separator plate half are bonded to each other, for example by a weld joint or a solder joint. This guarantees good mechanical stability and media-tightness.

In an additional embodiment, the at least one metallic electrical conductor and the end plate are designed and constructed so that the metallic electrical conductor extends in whole or at least in part through the end plate. This makes possible an electrical contact with the electrochemical system through the end plate.

An additional embodiment is characterized in that the contacting plate, on its front side facing the end plate, has at least one protrusion that projects beyond the rest of the surface of this front side. The protrusion is normally also made of a metallic material. The protrusion and the contacting plate are in electrical contact with each other. The protrusion and the contacting plate can be one piece. The protrusion can be welded or soldered to the contacting plate, which is also considered direct contact in the framework of this invention. To form the electrical conductor, the protrusion can extend through the end plate. The protrusion can therefore extend from the contacting plate to the outside of the electrochemical system. Alternatively or additionally, the protrusion can extend at least partly into a first recess of the end plate. The metallic electrical conductor can then contact the contacting plate inside the recess on the protrusion, for example. The fact that the protrusion extends through the end plate or that the protrusion extends at least partly into the end plate gives the end plate and the contacting plate or the stack cover additional mechanical stability.

The protrusion can be in the form of a dome or a bolt. The contacting plate and the protrusion can be one piece. The contacting plate and the protrusion can be made of the same material, e.g. stainless steel. In this manner, the occurrence of corrosion in the contact area between the contact plate and the protrusion can be completely or largely prevented. The protrusion can be bonded with the contacting plate, e.g. by means of a soldered connection or a welded connection. The contacting plate and the protrusion can also be made of different materials. For example, the protrusion can comprise a nickel sheet or a copper sheet or can be in the form of a nickel sheet or a copper sheet. The protrusion can have a gold coating. Nickel, copper and gold each have a particularly low specific electrical resistance.

The metallic electrical conductor and the contacting plate can be bonded to each other, in particular by means of a welded connection or a soldered connection. The metallic electrical conductor and the contacting plate can also be connected to each other positively or non-positively. For example, the end of the metallic electrical conductor contacting the contacting plate can be a plug that is inserted into a corresponding recess or socket in the contacting plate. The end of the metallic electrical conductor in contact with the contacting plate can also have a pressure spring that pushes the metallic electrical conductor against the contacting plate.

In an additional embodiment, the contacting plate can have an extension that extends in a lateral direction at least partly beyond the contour of the end plate for the formation of the metallic electrical conductor. The extension normally extends beyond the outside of the electrochemical system. However the extension can also project into an area that is aligned with a recess of the end plate and therefore projects beyond an inner contour of the end plate. In both solutions, the extension therefore extends in the un-bent state parallel to the end plane of the end plate or parallel to the end plane of the contracting plate. For example, the extension can be in the form of a bendable tab. In that case, the extension is typically bent on the outside of the electrochemical system toward the end plate. To increase the bendability of the extension, the extension can have a thickness that is less than the remaining portion of the contacting plate. Normally the contacting plate and the extension are in one piece; however, they can also be separate components. The contacting plate and the extension can be made of the same material or different materials. The contacting plate and the extension can be bonded to each other, e.g. by means of a soldered connection or a welded connection. The extension can be a metal sheet, e.g. a nickel sheet or a copper sheet. To improve the electrical conductivity, the extension can have a metallic coating, e.g. a gold coating.

If the at least one metallic electrical conductor and the contacting plate are not in one piece, it is advantageous if there is only one contact point for each metallic electrical conductor with the contacting plate. In this embodiment as well as in the one-piece embodiment, however, the electrochemical system according to the invention can have a plurality of contact points on a contacting plate, at each of which exactly one conductor picks up the current.

In an additional embodiment, the contacting plate is a metal sheet. It can therefore be manufactured particularly easily and economically. A material thickness of the contacting plate measured perpendicular to the end plane of the contacting plate can be between 0.1 mm and 8.0 mm, preferably between 0.2 mm and 3.0 mm, particularly preferably between 0.5 mm and 1.0 mm. The direction oriented perpendicular to the end plane of the contacting plate and of the end plate is also called the stacking direction below.

In an additional embodiment, at least one sealing device is located between the contacting plate and the end plate. The sealing device advantageously comprises a second recess in the side of the end plate facing the contacting plate and a sealing ring that is contained at least partly in the second recess. The sealing ring preferably forms a closed loop. The sealing ring can have an annular, oval or rectangular form. However, it can also be shaped in any other desired manner. Typically, the sealing ring is formed from an elastic material, e.g. from an elastomer. The hardness of the material from which the sealing ring is formed is preferably between 30 Shore A and 80 Shore A. The depth of the second recess determined along the stacking direction can be up to 10 mm, preferably up to 5 mm, particularly preferably up to 3 mm. The dimensions of the sealing ring are normally selected so that in the uncompressed state the sealing ring projects along the stacked direction by at least 0.1 mm and/or by up to 5.0 mm or by up to 2.0 mm beyond the second recess.

The end plate and contacting plate normally have openings for the conduct of a medium, in particular for the conduct of a process gas, a reaction product or a coolant. Normally, the sealing device or the sealing devices are located around these openings to seal them. On the other outer periphery, on the other hand, the plates of the electrochemical system according to the invention do not necessarily have a seal. It can be advantageous however, if along the outer periphery there is an encircling support device or a support device in segments or all the way around, the construction of which can be the same as the above-mentioned sealing device.

In an additional embodiment, the side of the contacting plate facing the end plate is flat at least in the vicinity of the sealing device. This makes it possible for the sealing ring to slide or roll along the contacting plate when the contacting plate and the end plate are displaced laterally relative to each other. This can occur in particular in the event of temperature variations, if the end plate and the contacting plate have different coefficients of thermal expansion.

In an additional embodiment at least 80 percent, preferably at least 90 percent of one surface facing the end plate of the contacting plate is flat. These are preferably each continuous flat areas of the surface. The surface of the contacting plate facing the end plate can also be completely flat. This simplifies the manufacture of the contacting plate and reduces manufacturing costs.

In an additional embodiment, the end plate and the contacting plate each have contact areas on their sides facing each other, along which the contacting plate and the end plate are in contact with each other in the compressed state. When the contacting plate and the end plate are pressed against one another by an application force along the stacking direction, this application force is preferably introduced primarily along this contact area into the end plate and into the contact plate. The application force is therefore preferably not or primarily not introduced via the sealing device into the end plate and into the contacting plate. In this manner the load on the sealing device can be relieved. For example, damage to the sealing device can be prevented in particular if the end plate and the contacting plate are displaced laterally relative to each other in the event of temperature variations.

The force exerted on the sealing device during the compression of the end plate against the contacting plate along the stacking direction is limited to that force that is necessary to compress the sealing device along the stacking direction just until the end plate and the contacting plate come in contact with each other along the contact areas. This greatest force exerted on the sealing device during the compression is also called the maximum force below. The magnitude of the maximum force can be set by a corresponding selection of the depth of the second recess along the stacking direction, the thickness of the sealing ring along the stacking direction, the elasticity or the hardness of the material of the sealing ring and the geometry of the contact areas. For example, the contact areas of the end plate and/or of the contacting plate can be formed at least in sections as protrusions that project from the respective plate along the stacking direction. Alternatively or additionally, the contact areas of the end plate and/or of the contacting plate can be in the form of recesses or indentations, at least in sections. The geometry of the contact areas is then determined in particular by the height of the protrusions and by the depth of the recesses/indentations along the stacking direction.

In an additional embodiment the depths of the second recess along the stacking direction, the thickness of the sealing ring along the stacking direction, the elasticity or the hardness of the material of the sealing ring and the geometry of the contract areas are defined so that the application force during the operation of the electrochemical system is at least twice, preferably at least five times and particularly at least ten times the maximum force. The application force is then introduced primarily into the end plate and into the contacting plate via the contact areas so that the load on the sealing device is significantly reduced and its useful life is extended.

A contact area between the end plate and the contacting plate measured along the contact areas in the compressed state is called the first contact surface below. In contrast to it, a contact surface measured along the sealing device in the compressed state between the sealing device and the end plate or between the sealing device and the contacting plate is called the second contact surface. The contact areas and the sealing device can be designed and constructed so that the first contact area is at least five times, preferably at least 10 times, particularly preferably at least 20 times the size of the second contact area. This also contributes to relieving the load on the sealing device and extending its useful life.

In an additional embodiment, the separator plate half has, on its back side facing away from the contacting plate, channels for the conduct of a medium, in particular for the conduct of a process gas or of a reaction product. The process gas can, for example, be conducted to a chemically active area of the electrochemical system in which chemical energy is converted into electrical energy. The separator plate half can be an embossed part in which the channels are embossed on the backside. The separator plate half can be formed from a metal sheet, e.g. from a stainless steel sheet. Typically, the separator plate half has a material thickness of a maximum 0.2 mm or a maximum 0.1 mm, but at least 0.025 mm.

Normally, during a conversion of this type of chemical energy into electrical energy, however, additional reaction heat is generated which is then discharged at least partly via the separator plate half of the stack cover plate. For the cooling of the separator plate half of the stack cover plate, the contacting plate can have channels for the conduct of a coolant on its side facing the separator plate half.

The contacting plate can, for example, be designed and constructed in the form of an embossed part with embossed first deformations. The first deformations can alternatively also be introduced in the contacting plate by chemical etching. The first deformations can then form the above-mentioned channels for the conduct of a coolant on the side of the contacting plate facing the separator plate half. The channels in the contacting plate formed by the first deformations can thereby have a cross-section that is different from the cross-section of the channels of the separator plate half. The cross-section of the channels formed by the first deformations available for the conduct of the coolant can be smaller than the cross-section of the channels formed for the conduct of coolant by the separator plates of the rest of the electrochemical system.

Alternatively or additionally, the cross-section of the channels formed by the first deformations for the conduct of the coolant can be larger than the cross-section that forms the channels of the separator plate half alone. The cross-section available for the conduct of coolant can be set by the sizing of the channels formed by the first deformations.

If the first deformations are embossed into the contacting plate, deformations on its surface facing the end plate are also formed that are called second deformations below. The side of the end plate facing the contacting plate can have third deformations. These third deformations can be designed so that the second deformations and the third deformations are contained one inside the other when the end plate and the contacting plate are pressed together. In particular, the end plate has a single third deformation that is in the form of a setback from the first contact surface and receives all the second deformations. The second and the third deformations are preferably designed so that in the compressed state they allow a movement of the end plate and the contacting plate relative to each other in the event of temperature variations.

The separator plate half, in terms of its thickness, the depth of its embossings and/or the diameter of its passage openings, can be essentially the same as the plate halves of the bipolar plates of the electrochemical system; however all of these parameters can also be different from those of the bipolar plates of the electrochemical system.

In an additional embodiment, the separator plate half of the stack cover plate also has at least one opening for the conduct of a medium, e.g. for the conduct of the coolant. On its side facing away from the contacting plate, the separator plate half can then have a sealing device with a bead to seal the opening in the separator plate half. This bead can have openings that are located so that they conduct the medium conducted through the opening of the separator plate half, primarily a coolant, into a space located between the separator plate half and the contacting plate. The bonded connection between the contacting plate and the separator plate half makes it possible to locate a space for the passage of a coolant between the contacting plate and the separator plate half.

The electrochemical system according to the invention can have a plurality of electrochemical cells which are separated from one another by separator plates. The separator plates can each have a cavity for the passage of the coolant. Although the space between the contacting plate and the separator plate and the cavities of the separator plates in the interior of the stack each have identical volumes, nevertheless during operation there can be an excessive cooling of the separator plate half of the stack cover plate. To prevent this and to achieve a uniform temperature distribution during operation both within the stack as well as on the periphery of the stack, it is therefore advantageous if the volume of the space formed between the contacting plate and the sensor plate half of the stack cover plate is smaller than the volume of the cavity of one of the separator plates.

Preferably, therefore, for the volume $V_Z$ of the space formed between the contacting plate and the separator plate half of the stack cover plate, and for the volume $V_H$ of the cavity of one of the separator plates: $0.5 \cdot V_H < V_Z < V_H$, particularly preferably $0.5 \cdot V_H < V_Z < 0.75 \cdot V_H$.

A backside of the separator plate half facing away from the contacting plate can be the boundary of an electrochemical cell, wherein the electrochemical cell, for example, comprises gas diffusion layers and a membrane electrode unit. The electrochemical cell is therefore immediately adjacent to the separator plate half.

The end plate is preferably an injection molded part made of PPS (phenylene sulfide), PI (polyimides), PAI (polyamide-imides), PPA (polyphthalamides), PA (polyamides) or glass fiber reinforced plastics. To reduce weight, it can be provided on its exterior with reinforcement fins and recesses between the reinforcement fins.

The invention further relates to an electrochemical system with an end plate as well as a stack cover plate adjacent to the end plate. The stack cover plate thereby has an electrically conductive contacting plate adjacent to the end plate and a conductive separator plate half facing away from the end plate. The contacting plate and the separator plate half are connected to each other electrically and media-tight. Between the end plate and the contacting plate there is at least one sealing device. The sealing device can be located in whole or at least in part in or on the side of the end plate facing the contacting plate. The area of the contacting plate facing the sealing device in the end plate is thereby flat. To compensate for different thermal expansions and contractions of the end plate and contacting plate caused by the different materials, the sealing device can slide or roll along the surface of the contacting plate. The purpose of the sealing device is thereby in particular to seal a media passage for reactants or coolants that extends through the separator plate half, the contacting plate and the end plate.

The electrochemical system advantageously has a plurality of separator plates or bipolar plates, the surface area of which is essentially equal to the surface area of the separator plate half or of the contacting plate. The plates of the stack cover plates therefore extend to the outer edge of the separator plates or bipolar plates of the electrochemical system and are clamped together with it.

The description provided above with reference to the sealing device, its location and the first to third protrusions also apply as appropriate for this embodiment of the invention.

The embodiments described here of the electrochemical system according to the invention, as well as individual features of the embodiments described here can be combined with one another in any appropriate fashion.

BRIEF DESCRIPTION OF THE DRAWINGS

Special embodiments of the electrochemical system proposed here are illustrated in the accompanying figures and are explained in greater detail below. In the figures:

FIG. 1 is a schematic illustration of an electrochemical system of the prior art with an end plate, a cover bipolar plate and with an electrical connection between the cover bipolar plate and an outside of the system;

DETAILED DESCRIPTION OF THE INVENTION

Figure 2:
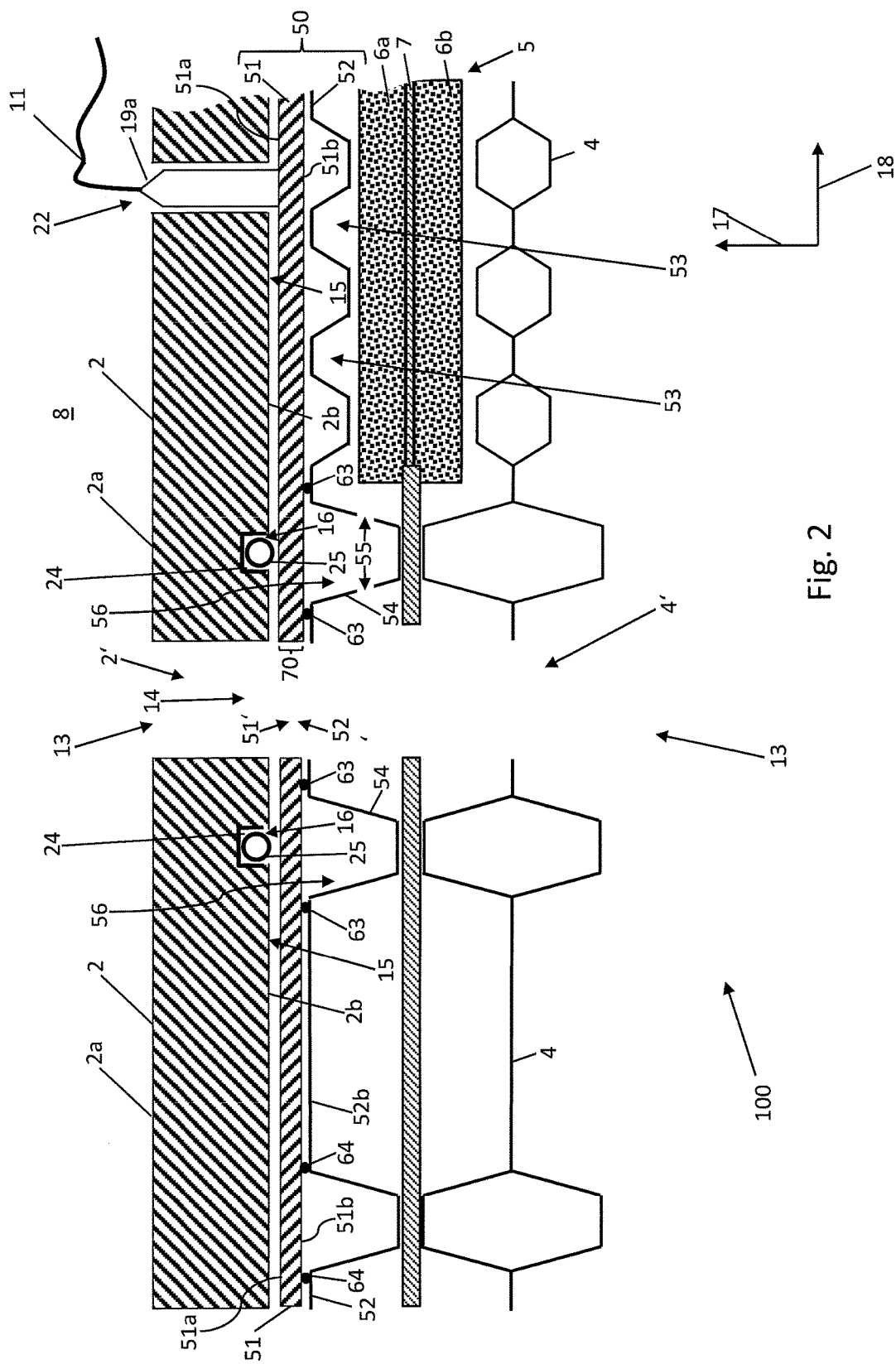
FIG. 2 is a schematic illustration of a first embodiment of an electrochemical system claimed by the invention with a stack cover plate adjacent to an end plate, wherein the stack cover plate has a contacting plate and a separator plate half.

FIG. 1 is a schematic illustration of an electrochemical system 1 of the prior art in the vicinity of an end plate and the elements immediately adjacent to it. The electrochemical system 1 comprises an end plate 2, a cover bipolar plate 3 immediately next to the end plate 2 and a separator plate 4 in the form of a bipolar plate. The plates 3, 4 are formed from stainless steel. Between the cover bipolar plate 3 and separator plate 4 there is an electrochemical cell 5. This cell comprises gas diffusion layers 6a, 6b as well as a membrane electrode unit (MEA) 7 and is used, for example, to convert chemical energy into electrical energy.

An electrical connection between the cover bipolar plate 3 and an outside of the system 1 is realized by means of a gas diffusion layer 9, a current lead 10 made of copper integrated into the end plate 2 and a copper electrical cable 11. The gas diffusion layer 9 is a fabric that contains graphite. The gas diffusion layer 9 is in electrical contact with the cover bipolar plate 3 and with the current lead 10. The copper cable 11 is in electrical contact with the current lead 10 and extends from the current lead 10 to the outside 8 of the system 1. At that point it is connected, for example, with an electrical consumer (not shown). High ohmic losses can occur at a first contact point 9a between the gas diffusion layer 9 and the current lead 10 and at a second contact point 9b between the gas diffusion layer 9 and the cover bipolar plate 3. Losses of this type reduce the efficiency of the system 1 when it is used as a voltage source, as an electrolyzer or for a similar purpose.

FIG. 2 illustrates one embodiment of an electrochemical system 100 according to the invention. Features that are illustrated here and are repeated in the description below are always identified by the same reference numbers. The system 100 is a fuel cell system. The system 100 has an end plate 2, a stack cover plate 50 immediately next to the cover plate 2 and a separator plate 4, here in the form of a bipolar plate. The stack cover plate 50 comprises a contacting plate 51 facing the end plate 2 and adjacent to the end plate 2 and a separator plate half 52 facing away from the end plate 2. The plates 51, 52 are formed of metal, here each from stainless steel, and are welded to each other media-tight multiple times or at least once. In particular, the plates 51, 52 are in electrical contact with each other. The contacting plate 51 is a metal sheet. Along a stacking direction 17 that is oriented perpendicular to the end surface planes of the plates 2, 51, 52, 4, the contacting plate 51 has a material thickness 70 of 0.9 mm, for example. A lateral direction 18 runs perpendicular to the stacking direction 17 and parallel to the end surface planes of the plates 2, 51, 52, 4. The end plate 2 is fabricated from a plastic material. The end plate 2 and contacting plate 51 therefore have different coefficients of thermal expansion.

The system 100 further has an electrochemical cell 5 with gas diffusion layers 6a, 6b enclosed between the separator plate half 52 and the separator plate 4, and an MEA 7. The cell 5 transforms chemical energy into electrical energy. The plates 52 and 4 are used to deliver process gas and to discharge reaction products to and from the cell 5 respectively, for the electrical contacting of the electrodes of the cell 5, for the discharge of heat that is generated during the conversion of chemical energy into electrical energy in the cell 5, and for the separation of the media in question. The system 100 has a plurality of additional separator plates (not shown) that are stacked along the stacking direction 17 and between which additional electrochemical cells are located.

The electrodes of the electrochemical cells of the system 100 are electrically connected with each other; here they are connected in electrical series. An electrical voltage produced by the electrochemical cells of the system 100 with respect to zero potential can be picked off at the contacting plate 51. An electrical connection between the contacting plate 51 and an outside 8 of the system 100 is realized by means of a metallic electrical conductor 19a. The conductor 19a and the contacting plate 51 are in electrical contact with each other on a front side 51a of the contacting plate 51 facing the end plate 2. At this point the conductor 19a and the contacting plate 51 are welded to each other. The conductor 19a is in one piece, e.g. it is a one-piece preformed part, in this case in the form of a bolt. The conductor 19a extends from the front side 51a of the contacting plate 51 to the outside 8 of the system, in particular to an outer side 2a of the end plate 2 facing away from the stack cover plate 50. The conductor 19a extends through a passage opening 22 in the end plate 2. The passage opening 22 extends from the outer side 2a of the end plate 22 to an inner side 2b of the end plate 2 facing the contacting plate 51. The conductor 19a is made of stainless steel and on the front side 51a of the contacting plate 51 forms a protrusion in the form of a bolt. The end of the conductor 19a facing away from the contacting plate 51 is in electrical contact with an electric cable 11 which is connected with an electrical consumer, for example.

In one variant embodiment of the system 100 that is not explicitly illustrated here, the contacting plate 51 and the metallic electrical conductor 19a can also be designed in one piece, e.g. as a one-piece preformed part. The electrical connection according to the invention between the contacting plate 51 and the outside 8 of the system 100 is therefore significantly improved compared to that of the system 1 illustrated in FIG. 1, in which high ohmic losses can occur at the contact points 9a and 9b.

Figure 3:
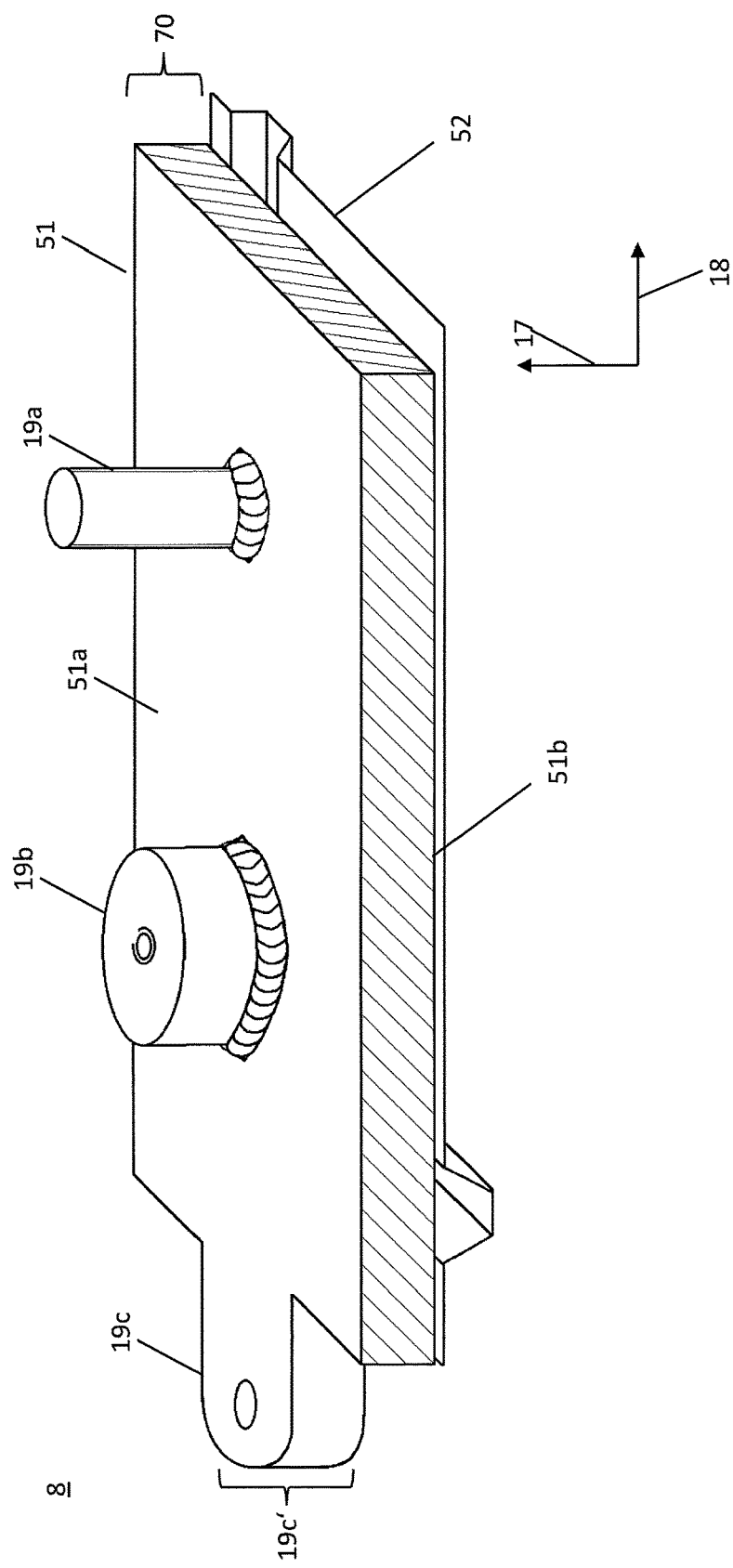
FIG. 3 is a schematic illustration of a second embodiment of the contacting plate illustrated in FIG. 2.
Figure 4:
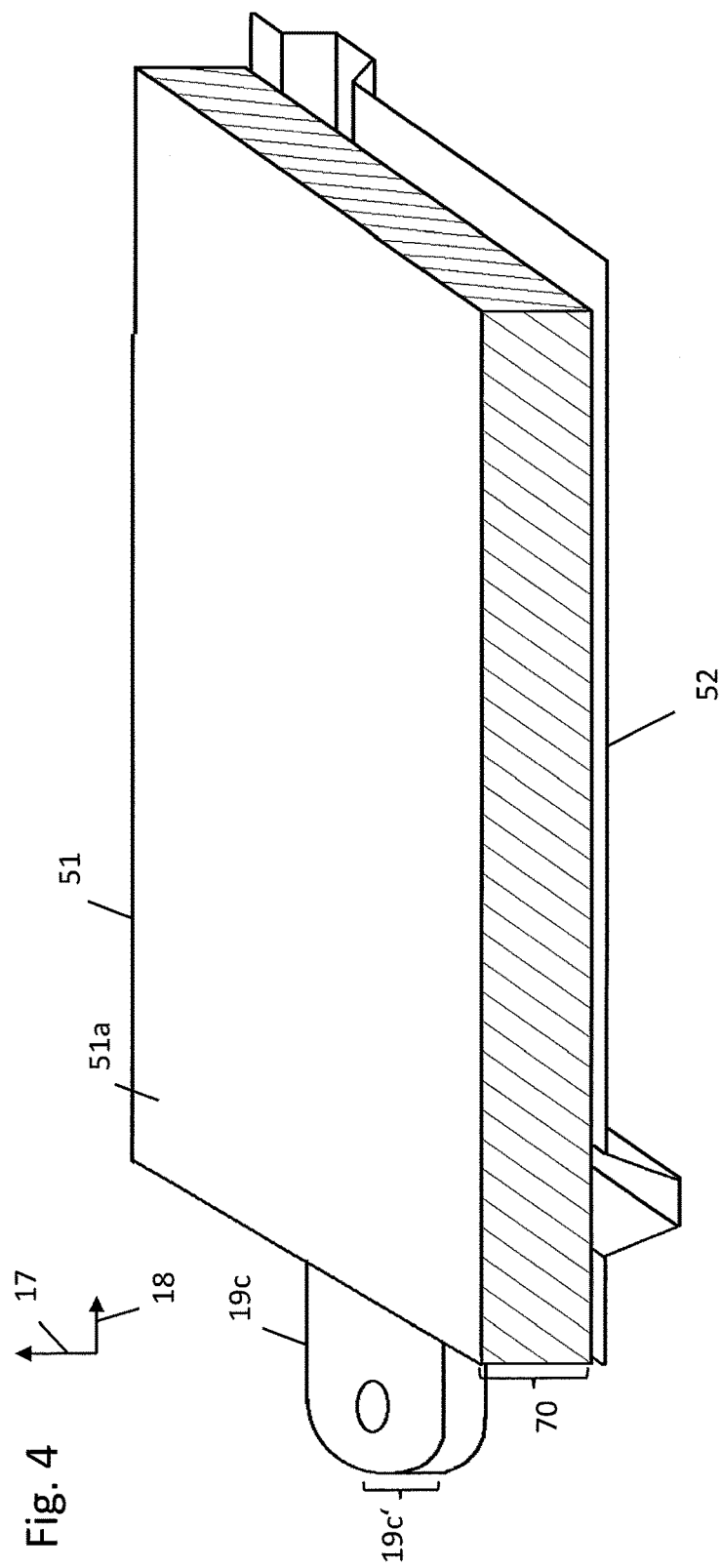
FIG. 4 is a schematic illustration of a third embodiment of the contacting plate illustrated in FIG. 2.

FIGS. 3 and 4 illustrate variant embodiments of the contacting plate 51 and of the separator plate half 52 illustrated in FIG. 2. The embodiments of the stack cover plate illustrated in FIGS. 3 and 4 also each have bonded connections between the contacting plate 51 and the separator plate half 52, in the manner of the bonded connections 63 and 64 illustrated in FIG. 2. In the interests of simplification, however, the bonded connection 63 and 64 is not illustrated in FIGS. 3 and 4. The contacting plate 51 in FIG. 3, in addition to the metallic electrical conductor 19a illustrated in FIG. 2, shows additional metallic electrical conductors 19b and 19c. The conductor 19b is in contact with the contacting plate 51 like the conductor 19a on its front side 51a facing the end plate 2, where it is welded with the contacting plate 51. The metallic conductor 19c forms a lateral extension of the contacting plate 51. The metallic conductor 19c and the contacting plate 51 are in one piece. In FIG. 3, a thickness 19c' of the conductor 19c measured along the stacking direction 17 has the same material thickness 70 as the contacting plate 51. The conductor 19c extends laterally to the outside of the system 100 (not shown), where it can be welded or soldered with a cable, for example. The separator plate half 52 is at least 90 percent flat in the embodiment illustrated in FIG. 3.

On one hand, the conductors 19a, 19b and 19c illustrated here are used next to one another in a single contacting plate 51 to pick off the current. On the other hand, the conductors 19a, 19b and 19c also represent different types of electrical conductors by way of example, of which only one or also more of a single one of the illustrated three different types 19a, 19b and 19c can be present in a contacting plate 51. Basically, therefore, voltage can be picked off at different points on a contacting plate 51 by means of a plurality of conductors, wherein there is only one contact point for each conductor. If the contacting plate has only one single conductor 19a, 19b in the form of a protrusion, this protrusion is advantageously located in the vicinity of the surface center of gravity of the contacting plate or is aligned with the surface center of gravity of the end plate.

FIG. 4 shows a variant embodiment of the conductor 19c illustrated in FIG. 3. The conductor 19c illustrated in FIG. 4 differs from the conductor 19c illustrated in FIG. 3 in that the thickness 19c' is less than the material thickness of the contacting plate 51. For example, the thickness 19c' of the conductor 19c in FIG. 3 is less than 50 percent or less than 20 percent of the material thickness 70 of the contacting plate 51. In this manner, the conductor 19c in FIG. 4 forms a tab that can be easily bent on the outside of the system 100, e.g. toward the end plate 2 in the stacking direction 17.

In the system 100 illustrated in FIG. 2, the plates 2, 51, 52 and 4 have aligned openings 2', 51', 52' and 4' that form a channel 13 for the conduct of a medium 14. The medium 14 can be a process gas, e.g. molecular hydrogen or molecular oxygen, a reaction product, e.g. water vapor, or a coolant. The system 100 has a sealing device 16 to close off the channel 13 from a space 15 between the end plate 2 and the contacting plate 15. The sealing device 16 is located between the end plate 2 and the contacting plate 51 around the channel 13. The sealing device 16 surrounds the opening 2' in the end plate 2 and the opening 51' in the contacting plate 51 laterally and extends in a plane parallel to the end surface planes of the end plate 2 and of the contacting plate 51.

The sealing device 16, for example, comprises a ring-shaped recess 24 on the inside 2b of the end plate 2 and an elastic sealing ring 25 located in the recess 24. The hardness of the elastomer from which the sealing ring 25 is formed can be 60 Shore A, for example. Along the stacking direction 17, the dimensions of the recess 24 and of the sealing ring 25 are selected so that the sealing ring 25 in the uncompressed state projects along the stacking direction 17 beyond the inside 2b of the end plate 2, e.g. by at least 10 percent or at least by 20 percent of a depth of the recess 24 measured along the stacking direction 17.

Here, the depth of the recess 24, a thickness of the sealing ring 25 measured along the stacking direction 17 and the hardness of the sealing ring 25 are selected so that the force that must be exerted parallel to the stacking direction 17 by means of the end plate 2 and the contacting plate 51 on the sealing ring 25, to compress the sealing ring 25 so that the end plate 2 and the contacting plate 51 touch one another is a maximum of 10 percent or a maximum of 5 percent of the application force typically applied for the compression of the system 100 along the stacking direction. It is thereby guaranteed that the application force effective between the end plate 2 and the contacting plate 51 is transmitted primarily by means of the inner side 2a of the end plate 2 and the front side 51a of the contacting plate 51 into the end plate 2 and into the contacting plate 51, and not via the sealing device 16.

In the system 100 illustrated in FIG. 2, the inner side 2a of the end plate 2 is completely flat. Likewise, the front side 51a of the contacting plate 51 is completely flat. The back side 51b of the contacting plate 51 facing the separator plate half 52 is also completely flat. The inside 2b of the end plate 2 and the front side 51a of the contacting plate 51 therefore each form contact areas for the end plate 2 and the contacting plate 51 that are brought into contact with each other when the system 100 is compressed. The front side 51a of the contacting plate 51 is flat, particularly in the vicinity of the sealing device 16. Therefore, in the event of temperature variations, when the end plate 2 and the contacting plate are displaced relative to each other perpendicular to the stacking direction 17 as a result of their different coefficients of thermal expansion, the sealing ring 25 can slide or toll over the front side 51a of the contacting plate, which is flat or smooth in the vicinity of the sealing device 16. The dimensions of the flat area of the front side 51a of the contacting plate 51 which is flat in the vicinity of the sealing device 16 can be selected as a function of the magnitude of the expected displacement of the end plate 2 and of the contacting plate 51. This selection customarily depends on the coefficients of thermal expansion of the end plate 2 and of the contacting plate 51 and on the temperature range in which the system 100 is designed to be used. The system 100 is conventionally designed for use at temperatures between −40° C. and 100° C. The sealing device 16 is particularly long-lived. In particular, the sealing device 16 can be reused without any problems if the system 100 is disassembled.

The separator plate half 52 is in the form of an embossed part. On its back side 52b facing away from the contacting plate 51, the separator plate half 52 has channels 53 for the conduct of a process gas that is fed to the electrochemical cell 5. In this case the channels 53 are embossed into the separator plate half 52 in an embossing process. A thickness of the separator plate half 52, which is made of stainless steel, measured perpendicular to the end surface plane of the separator plate half 52, can be less than 0.2 mm or less than 0.1 mm, for example.

To seal the electrochemical cell 5 from the channel 13, the separator plate half 52 also has, on its back side 52b, a sealing device that surrounds the channel 13 with an annular bead 54 that projects along the stacking direction 17 beyond the channels 53. The bead 54 has openings 55 (see also FIGS. 7 and 9), through which a cooling fluid can be conducted into a space 56. The space 56 is located between the contacting plate 51 and the separator plate half 52 and is enclosed by the plates 51, 52. For this purpose the contacting plate 51 and the separator plate half 52 are welded to each other on both sides of the bead 54 all the way around and media-tight along the weld seam 63. The weld segments 64, which are visible in the vicinity of the outer edges of the plates 51 and 52, are here provided only in segments and are for the purpose of stabilizing the overall system.

Figure 5:
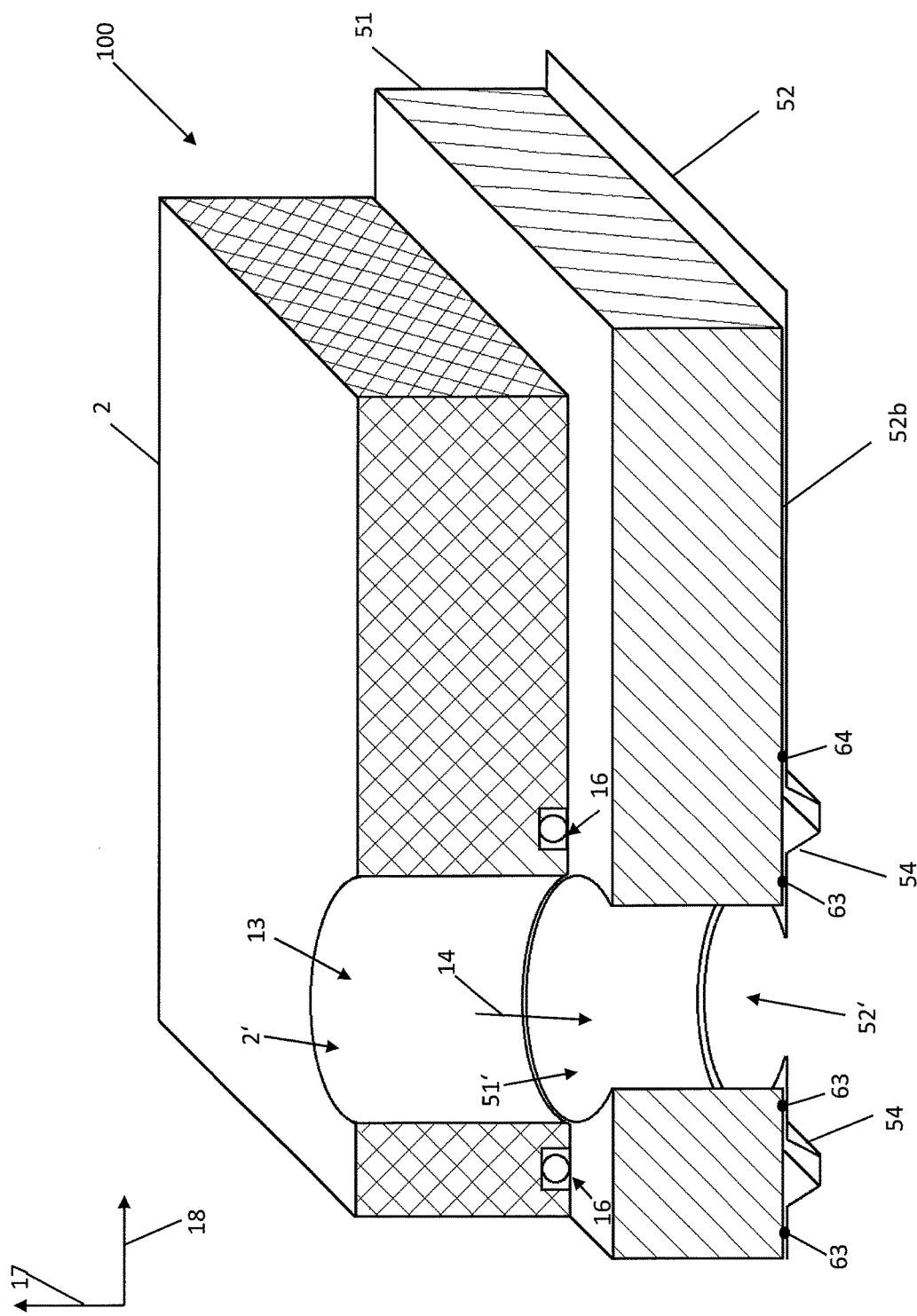
FIG. 5 is a schematic view in perspective of the electrochemical system illustrated in FIG. 2.

FIG. 5 is a schematic view in perspective of the system 100 illustrated in FIG. 2 that shows in particular the structure of the channel 13 that is formed by the aligned openings 2', 51', 52' in the plates 2, 51, 52. The metallic electrical conductor 19a and the channels 53 on the back side 52b of the separator plate half 52 are not shown in FIG. 5 merely for purposes of simplification.

Figure 6:
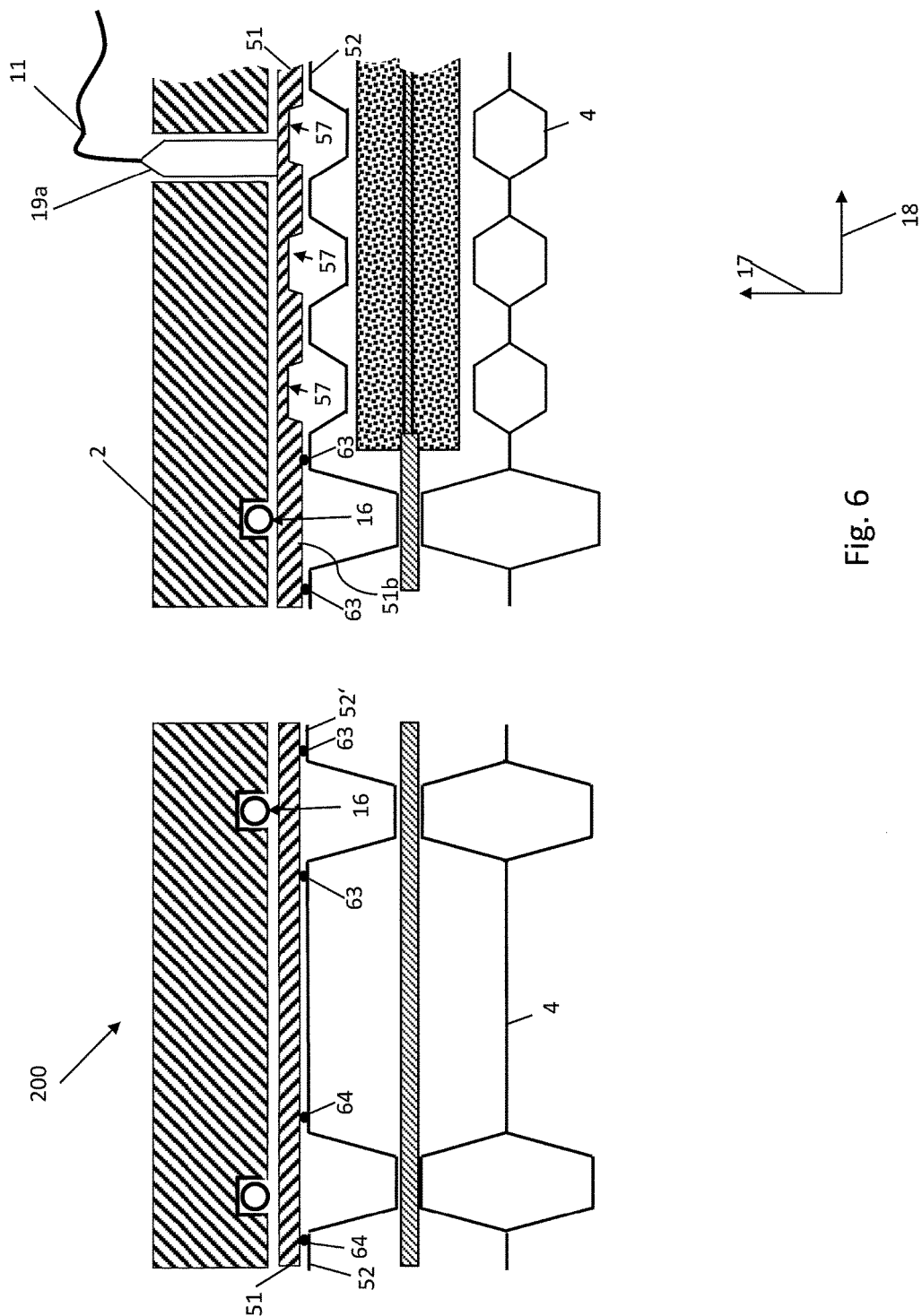
FIG. 6 is a schematic illustration of a second embodiment of the electrochemical system according to the invention, wherein the contacting plate has channels for the conduct of a medium.

FIG. 6 shows an electrochemical system 200 that is a slightly different embodiment of the electrochemical system 100 illustrated in FIG. 2. The system 200 differs from the system 100 in that the contacting plate 51 is not flat on its backside 51b facing the separator plate half 52 but has channels 57 for the conduct of a coolant. This makes possible or improves the cooling of the separator plate half 52, by means of which normally at least a portion of the heat of reaction generated in the electrochemical cell 5 is discharged. The channels 57 can be formed by an etching process, for example. For purposes of simplification, potential passages in the bead or plate connections were not illustrated in FIG. 6.

Figure 7:
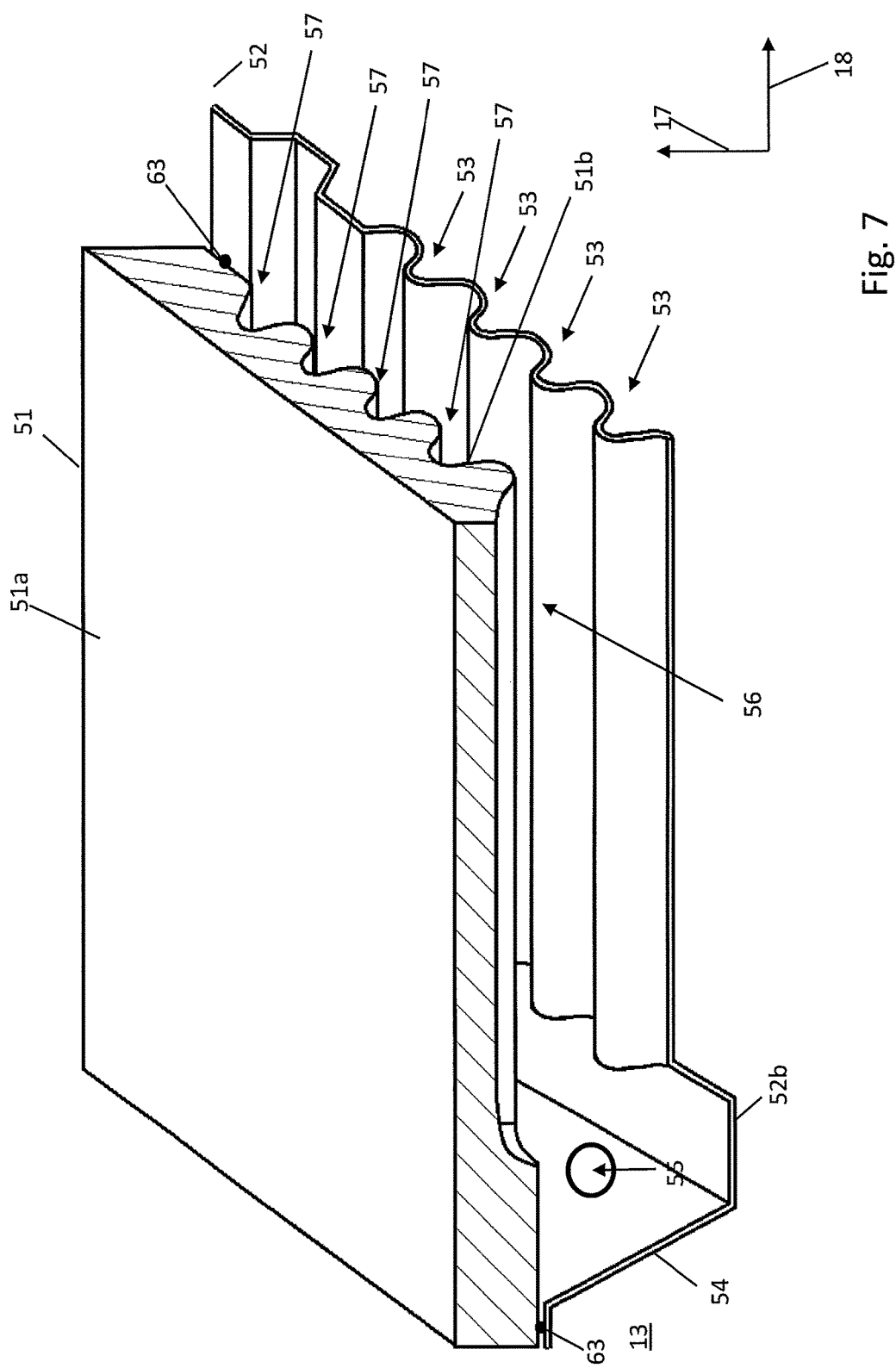
FIG. 7 is a schematic detail of the contacting plate and the separator plate half illustrated in FIG. 6 in a perspective view.

FIG. 7 is a schematic detail of a section of the contacting plate 51 and of the separator plate half 52 of the system 200 illustrated in FIG. 6 in a perspective view. The completely smooth or flat front side 51k and the structured backside 51b of the contacting plate 51 with the channels 57 formed by the structuring can be clearly seen. The separator plate half 52, which is an embossed part, with the channels 53 formed on the backside 52b, the bead 54 and an opening 55, through which coolant can flow to cool the separator plate half 52 from the channel 13 into the space 56 between the contacting plate 51 and the separator plate half 52 are also visible.

Figure 8:
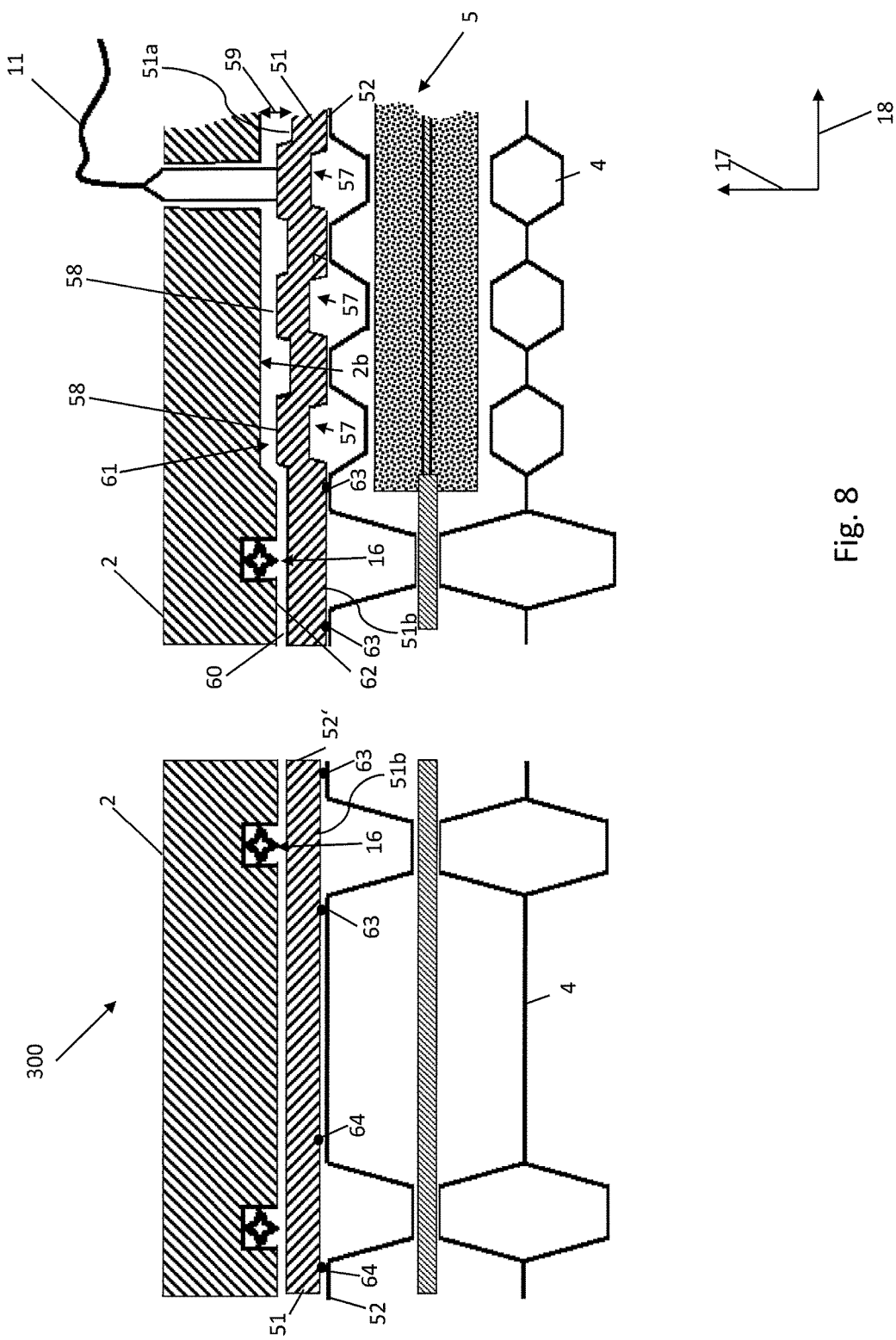
FIG. 8 is a schematic illustration of a third embodiment of the electrochemical system according to the invention, wherein the contacting plate is an embossed part.

FIG. 8 shows an electrochemical system 300 that is a variant embodiment of the system 200 illustrated in FIGS. 6 and 7. The system 300 differs from the system 200 illustrated in FIGS. 6 and 7 in that the contacting plate 51 is an embossed part with embossed first and second deformations, wherein the first deformations on the backside 51b of the contacting plate 51 facing the separator plate 52 form the above-mentioned channels 57 for the conduct of the coolant. The channels 57 of the contacting plate 51 thereby have a cross-section that is different from that of the channels 56 of the separator plate half 52, so that the cross-section available for the conduct of the coolant is on one hand smaller than the cross-section available for the conduct of the coolant through the bipolar plate 4, but on the other hand is larger than the cross-section spanned by the channels 56 in the embodiment illustrated in FIG. 2. The cross section available for the conduct of the coolant can therefore be set by the sizing of the channels 57.

The second deformations project into the contact areas 58 in the stacking direction 17 toward the end plate 2 by a length 59 beyond a flat area 60 of the front side 51a of the contacting plate in the vicinity of the sealing device 16. The end plate 2, on its inner side 2b, has a third deformation in the form of a recess 61. The recess 61, with reference to a flat area 62 of the inner side 2b of the end plate 2, in the vicinity of the sealing device 16, has a depth measured along the stacking direction 17 that is equal to the above-mentioned length 59. Consequently, when the end plate 2 and the contacting plate 51 are pressed together in the stacking direction, the inner side 2b of the end plate 2 and the front side 51a of the contacting plate 51 are brought into contact both along the flat areas 60, 62 in the vicinity of the sealing device 16 and along the contact areas 58 projecting into the recess 61, which relieves the load on the sealing device 16. FIG. 8 also shows that the sealing element 16 is in no way required to have a round cross-section, and the rhomboid cross-section is illustrated only by way of example. Here, too, the illustration of potential bead passages or plate connections has been omitted for purposes of simplicity.

Figure 9:
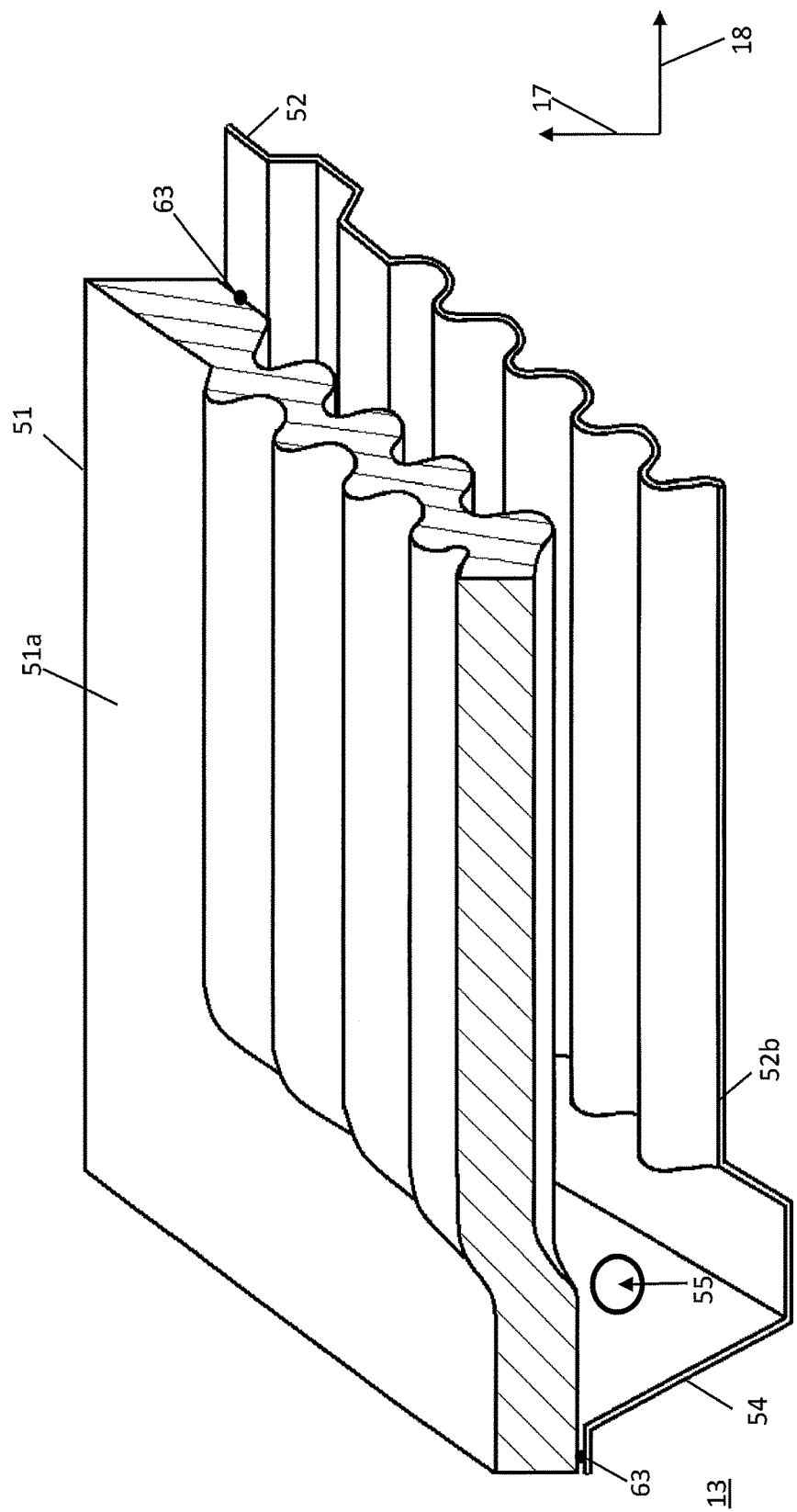
FIG. 9 is a schematic detail of the contacting plate and the separator plate half illustrated in FIG. 8 in a perspective view.

FIG. 9 is a schematic detail of a section of the contacting plate 51 and of the separator plate half 52 of the system 300 which is illustrated in a perspective view in FIG. 8. The first and second deformations embossed into the contacting plate 51, which is in the form of an embossed part, are clearly visible.

The invention claimed is:

1. The electrochemical system, comprising:
an end plate;
a stack cover plate adjacent to the end plate; and
at least one metallic electrical conductor;
wherein the stack cover plate has an electrically conductive contacting plate adjacent to the end plate and an electrically conductive separator plate half facing away from the end plate, wherein the contacting plate and the separator plate half are connected to each other electrically and fluid-tight;
wherein the metallic electrical conductor extends to an outside of the electrochemical system; and
wherein the metallic electrical conductor and the contacting plate are in one piece or the metallic electrical conductor contacts the contacting plate directly;
wherein the contacting plate and the separator plate half are bonded to each other with a welded connection;
wherein the contacting plate is an embossed part with contacting plate back side deformations and contacting plate front side deformations, said contacting plate back side deformations comprising channels for the conduct of a coolant on a back side of the contacting plate facing the separator plate half, and wherein the inner side of the end plate facing the contacting plate has at least another deformation that is designed so that the at least another deformation receives the contacting plate front side deformations when the end plate and the contacting plate are pressed together.

2. The electrochemical system of claim 1, wherein the separator plate half, on its back side facing away from the contacting plate has channels for the conduct of a process gas or of a reaction product.

3. The electrochemical system of claim 1, wherein the separator plate half has at least one opening for the conduct of a coolant, and wherein the separator plate half, on its back side facing away from the contacting plate, has a sealing device to seal the opening.

4. The electrochemical system of claim 3, wherein the sealing device is a bead, wherein the bead has openings that are designed to conduct a coolant that is conducted through the opening of the separator plate half into a space located between the separator plate half and the contacting plate.

5. The electrochemical system of claim 1, wherein the bonded connection between the contacting plate and the separator plate half is formed by a space located between the contacting plate and the separator plate half for the conduct of a coolant.

6. The electrochemical system of claim 5, further comprising a plurality of electrochemical cells which are separated from one another by separator plates, wherein the separator plates each have a cavity for the passage of a coolant and wherein the volume of the space formed between the contacting plate and the separator plate half of the stack cover plate is smaller than the volume of the cavity of one of the separator plates.

7. The electrochemical system of claim 6, wherein the following relation applies for the volume $V_Z$ of the space formed between the contacting plate and the separator plate half of the stack cover plate and for the volume $V_H$ of the cavity of one of the separator plates: $0.5 \cdot V_H < V_Z < V_H$.

8. The electrochemical system of claim 1, wherein a back side of the separator plate half facing away from the contacting plate forms the boundary of an electrochemical cell, wherein the electrochemical cell comprises gas diffusion layers and a membrane electrode unit.

9. The electrochemical system of claim 1, wherein the electrical conductor extends in whole or at least in part through the end plate.

10. The electrochemical system of claim 1, wherein the contacting plate, on its side facing the end plate, has a protrusion, whereby the protrusion extends through the end plate to form the electrical conductor.

11. The electrochemical system of claim 1, wherein the electrical conductor and the contacting plate are bonded to each other with a welded connection or a soldered connection.

12. The electrochemical system of claim 1, wherein the contacting plate has an extension that projects parallel to the end surface plane of the end plate beyond the end plate to form the electrical conductor, wherein the extension is in the form of a bendable tab.

13. The electrochemical system of claim 1, wherein the contacting plate is a metal sheet, wherein a material thickness of the contacting plate measured perpendicular to the end surface plane of the contacting plate is between 0.5 mm and 1.0 mm.

14. The electrochemical system of claim 1, further comprising a sealing device located between the contacting plate and the end plate, wherein the sealing device has a second recess in the end plate and a sealing ring that is held at least partly in the second recess.

15. The electrochemical system of claim 14, wherein a front side of the contacting plate facing the end plate is flat at least in the vicinity of the sealing device, so that the sealing ring, in the event of a displacement of the end plate relative to the contacting plate parallel to the end surface plane of the contact plate, is able to slide or roll on the contacting plate.

16. The electrochemical system of claim 14, wherein the end plate and the contacting plate have contact areas facing each other that are designed so that during the operation of the electrochemical system, when the end plate and the contacting plate are pressed together along an application direction oriented perpendicular to the end surface plane of the end plate and of the contacting plate, the contact areas are in contact with each other so that an application force acting along the application direction is transmitted primarily via the contact areas and primarily not via the sealing device.

17. The electrochemical system of claim 14, wherein the end plate and the contacting plate have openings for the conduct of a medium, wherein the sealing device for the sealing of the openings is located around the openings.

18. The electrochemical system of claim 1, wherein at least 90 percent of a front side of the contacting plate facing the end plate is flat.

19. The electrochemical system of claim 1, wherein the separator plate half has at least one opening for the conduct of a medium, and wherein the separator plate half, on its back side facing away from the contacting plate has a sealing device with a bead for the sealing of the opening, wherein the bead has openings that are designed to conduct a medium being conducted through the opening of the separator plate half into a space located between the separator plate half and the contacting plate.

20. The electrochemical system of claim 1, wherein the system has two end plates, stack cover plates next to them, and a plurality of separator plates lying between the stack cover plates.

21. The electrochemical system of claim 1, wherein the electrochemical system is a fuel cell system, an electrochemical compressor or an electrolyzer.

22. The electrochemical system of claim 1, wherein the contacting plate, on its side facing the end plate, has a protrusion, wherein the protrusion extends at least partly into a first recess of the end plate and the electrical conductor contacts the contacting plate inside the recess on the protrusion.

23. The electrochemical system of claim 19, wherein the medium is a coolant.

* * * * *